United States Patent

[11] 3,574,353

[72] Inventors Werner Fromme
Greffen;
Helmut Claas, Harsewinkel, Germany
[21] Appl. No. 820,490
[22] Filed Apr. 30, 1969
[45] Patented Apr. 13, 1971
[73] Assignee Gebr. Claas
Harsewinkel uber Gutersiok, Germany

[54] LATERALLY SWINGABLE HITCHING POLE FOR AGRICULTURAL MACHINE
7 Claims, 3 Drawing Figs.
[52] U.S. Cl. ................................................ 280/462,
56/218
[51] Int. Cl. ................................................ B60d 1/16
[50] Field of Search ........................................ 280/462,
467, 411—413; 56/218

[56] References Cited
UNITED STATES PATENTS
| | | | |
|---|---|---|---|
| 1,542,581 | 6/1925 | Prilipp .......................... | 280/467 |
| 2,429,492 | 10/1947 | Scranton ...................... | 280/462X |
| 2,954,240 | 9/1960 | Welling ........................ | 280/462 |
| 3,014,737 | 12/1961 | Claas ............................ | 280/462 |

FOREIGN PATENTS
| | | | |
|---|---|---|---|
| 1,257,741 | 2/1961 | France ......................... | 56/218 |
| 391,103 | 2/1924 | Germany ...................... | 56/218 |

*Primary Examiner*—Leo Friaglia
*Attorney*—Michael S. Striker

ABSTRACT: An agricultural machine of the type which is drawn by tractor or other locomotion-providing vehicle. The machine has a wheeled carriage traveling in predetermined direction, a hitching pole for hitching the carriage to the tractor or like vehicle, mounting means mounting one end of the hitching pole to the carriage for pivoting movement relative thereto about a pivot axis between two positions in one of which the hitching pole stands in substantial parallelism with the direction of travel and in the other of which it extends transverse to the direction of travel laterally beyond the carriage. Arresting means arrests the hitching pole in the respective positions thereof and includes a traverse member provided on the carriage and having a slot one portion of which extends substantially normal to the direction of travel and the other portion of which is inclined to the one portion and to the direction of travel. A pin is rigidly provided on the hitching pole and guided for sliding movement in the slot. A double-armed lever is pivotably mounted laterally of the slot so that the respective end portions of its arms can move across the slot at one or the other end of the latter, and a manually operable handle is associated with this lever and serves to move one or the other end portion of the arms thereof across the slot so that, when the pin is located at one or the other end of the slot, it can be blocked in its position and prevented from movement.

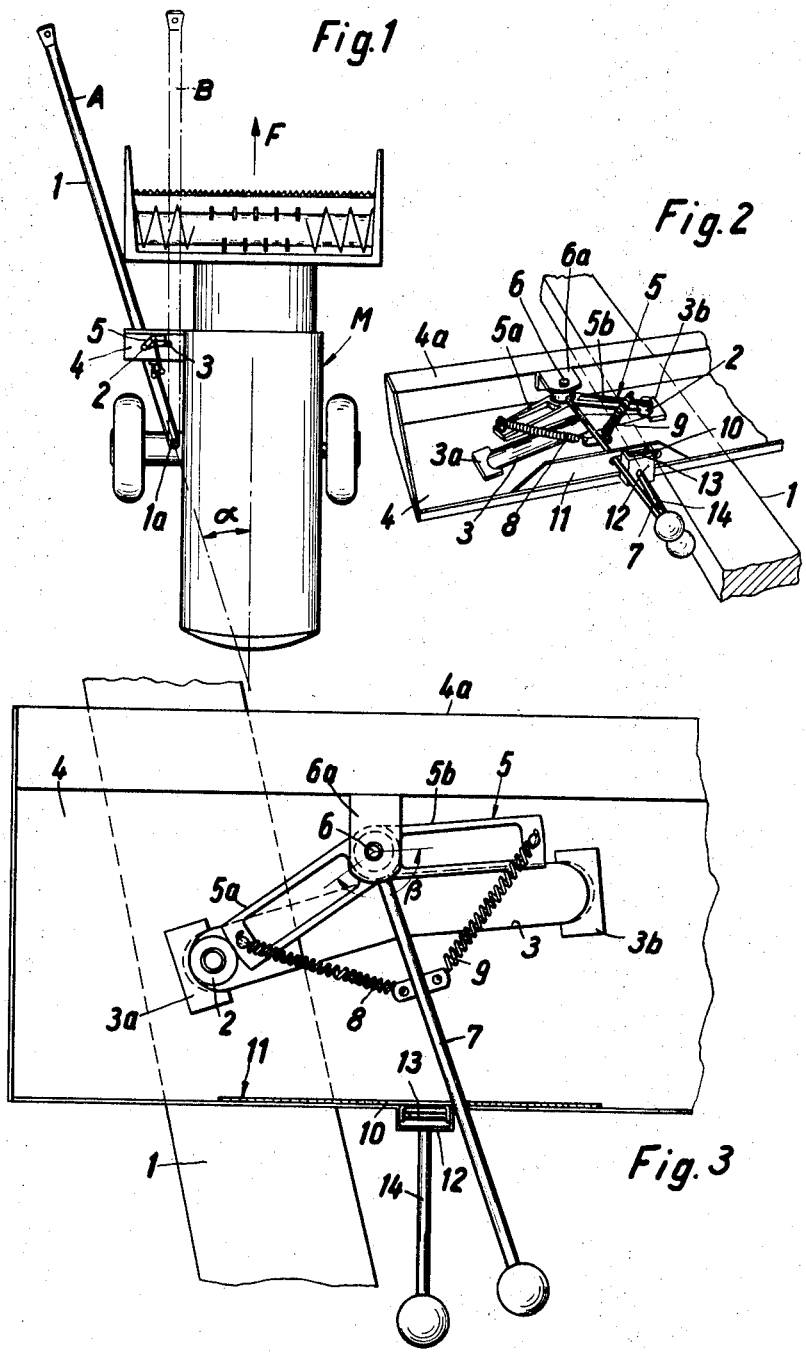

LATERALLY SWINGABLE HITCHING POLE FOR AGRICULTURAL MACHINE

BACKGROUND OF THE INVENTION

The present invention relates to agricultural machines in general, and more particularly to the type of agricultural machines which is not self-propelled.

Many agricultural machines are self-propelled. There are, however, others which must be drawn, as by a tractor or an analogous vehicle. These include harvesters, threshers and other agricultural machines. Of these nonself-propelled machines there are some where it is desired that the locomotion-providing vehicle, hereafter for the sake of convenience called a tractor, but not to be limited thereto, is to move along in a path laterally offset from and parallel to the direction of movement of the respective agricultural machine. This is necessary or desirable in certain instances where the nature of the work performed by the agricultural machine makes it impossible or undesirable that the agricultural machine and the tractor be hitched in an inline arrangement.

Of course, such type of propulsion for the agricultural machine is not practical when the latter must be moved on public roads, for instance from one field to another remote field. Under these circumstances the agricultural machine and its tractor must obviously be hitched for inline movement. It is therefore known to provide such agricultural machines with hitching poles which are tiltably mounted on the agricultural machine and are releasably connectable with the tractor. Such hitching poles can be tilted between two positions in one of which they extend in parallelism with the direction of travel of the agricultural machine so that the latter can be hitched to a tractor in inline arrangement, and a second position in which the hitching pole extends laterally beyond the one side of the agricultural machine and is inclined to the direction of advancement thereof. When the pole is arranged in this second position and is releasably secured to the tractor, it will cause the agricultural machine to move alongside the tractor laterally offset but in parallelism therewith.

Evidently, the hitching pole must be securable in both positions, and for this purpose various arresting arrangements which are already known in the art. However, these suffer from various disadvantages which may be briefly summarized by stating that they are either complicated in their construction and therefore handling, or that they do not provide absolute reliability in preventing the hitching pole from the once selected position.

SUMMARY OF THE INVENTION

It is, accordingly, an object of the present invention to overcome these disadvantages.

A more particular object of the invention is to provide an agricultural machine of the type in question wherein the arresting arrangement according to the present invention is such as to overcome these disadvantages.

Still more particularly the arresting arrangement according to the present invention and provided in an agricultural machine of the type under discussion is intended to be considerably more simple and economical in its construction, and also more readily operable.

A further object of the invention is to assure that the arresting arrangement is absolutely reliable in arresting the hitching pole in its once selected position.

In pursuance of the above objects, and others which will become apparent hereafter, one feature of the invention resides in the provision of an agricultural machine of the type having a wheeled carriage which travels in a predetermined direction, with a hitching pole being provided for hitching the carriage to a locomotion-providing vehicle such as a tractor. Mounting means mounts one end of the hitching pole on the carriage for pivoting movement about a pivot axis between two positions relative to the carriage in one of which the hitching pole extends in substantial parallelism with the direction of travel of said carriage and in the other of which it extends transverse to this direction and laterally beyond the carriage. Arresting means is provided and serves for arresting the hitching pole in the respective positions thereof.

According to the present invention the arresting means comprises a pin which is rigidly provided on the hitching pole proximal to but spaced from the pivot axis about which the hitching pole pivots. Elongated guide means slidably guides the pin for movement in a predetermined path between two end positions each of which corresponds to one of the positions of the hitching pole. Locking means is mounted for movement across this path so as to block the same when the pin is in a respective one of the end positions, and operating means is associated with the arresting means for effecting movement of the locking means in a sense BLOCKING and unblocking the path at the will of an operator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a somewhat diagrammatic plan view of an agricultural machine according to the present invention;

FIG. 2 is a partly sectioned fragmentary detail view illustrating the arresting means according to the present invention and showing the hitching pole in one position; and FIG. 3 is a top-plan view of FIG. 2 but showing the hitching pole in the other position thereof.

DESCRIPTION OF THE PREFERRED EMBODIMENTS

Discussing now the drawing in detail it will be seen that reference character M generally identifies an agricultural machine having a wheeled carriage. The wheels and the axle, which latter is not turnable with respect to the machine M, have been illustrated but not identified with reference numerals because this is not essential for the present invention.

A conventional hitching pole is identified with reference numeral 1 and is shown to be turnable about a pivot axis 1a, in which it is mounted on the agricultural machine M, between two positions. One position is identified with reference character A and it will be seen that in this position, in which the hitching pole 1 is shown in full lines, it extends laterally beyond the agricultural machine M so that, when a tractor or analogous locomotion-providing vehicle is releasably secured to the free end of the hitching pole 1, the agricultural machine M will move laterally of but in parallelism with the tractor. The second position of the hitching pole 1 is identified with reference character B and is illustrated in broken lines. In this position the hitching pole 1 extends in parallelism with the direction of forward movement F of the agricultural machine M, and the tractor can then be hitched to the free end of the hitching pole 1, but will then draw the agricultural machine M in an inline arrangement. Both of these positions, and the manner in which the agricultural machine M is located with respect to the tractor, are well known to those skilled in the art and require no further description.

The hitching pole must be capable of being arrested in the respective positions A and B thereof. According to the present invention it is provided at its connected end portion with a rigid pin 2 which is located proximal to the pivot axis 1a but spaced therefrom longitudinally of the hitching pole 1. This is clearly visible in FIG. 1.

As shown in FIG. 1 as well as in FIGS. 2 and 3, there is further provided a traverse member 4 connected rigidly with the agricultural machine M, for instance with the frame thereof, and this traverse member 4 is formed with an elongated slot 3 comprising two portions which are mutually inclined to one another, and one of which extends substantially normal to the direction of movement M, whereas the other is inclined to this direction, as is particularly clearly visible in FIGS. 1 and 3. The configuration and dimensions of the slot 3 are so selected that when the pin 2, which extends into the slot 3 and is slidably guided therein, is located at one or the other opposite end of the slot 3, the hitching pole 1 will be either in the position A thereof (compare FIG. 3) or in the position B (compare FIG. 2). When the hitching pole 1 is in the position A as shown in FIG. 1, it extends at an angle $\alpha$ with the direction $F$ of forward movement of the agricultural machine M.

To arrest the pin 2 in the respective end positions thereof, and thereby to arrest the hitching pole 1 in the positions A or B thereof, it is necessary to provide suitable locking means. This is provided, in accordance with the present invention, in form of a double-armed lever 5 having two arms 5a and 5b which in the illustrated embodiment are identical and define with one another an angle $\beta$. The lever 5 is mounted for pivoting or turning movement about an axis 6 defined by a shaft or pin and the latter in turn is secured in a mounting portion 6a extending from a stiffening portion 4a of the traverse member 4. Evidently, the dimensions of the lever 5, as well as its configuration and the position of the pivot axis 6 must be so selected that one or the other opposite end portions of the lever 5 can extend across the slot 3 proximal to the respective ends thereof so as to engage and prevent the pin 2 from moving longitudinally of the slot 3 out of its position in the respective end portion. Thus, in FIG. 2 the pin 2 will be seen to be located at the right-hand end portion of the slot 3, and the free end of the arm 5b extends across the slot 3 rearwardly of the pin 2 and thus prevents movement of the latter longitudinally of the slot. In FIG. 3 the pin 2 is located at the opposite end of the slot 3, and it is the free end of the arm 5a of the lever 5 which extends across the slot and prevents the pin 2 from moving longitudinally thereof. Abutment plates 3a and 3b are provided at the respective opposite ends of the slot 3 for reinforcement purposes.

Turning of the lever 5 is effected by a rodlike handle 7 which is to be gripped by the hand of an operator for manual movement. In the illustrated embodiment the handle 7 is also mounted for turning movement about the pivot axis 6 and is connected with the opposite free ends of the arms 5a and 5b, respectively, of the lever 5 only via springs 8 and 9 which are respectively connected with these free ends of the arms 5a and 5b and with the handle 7 at a location thereof which is spaced lengthwise of the handle 7 from the pivot axis 6. This is most clearly illustrated in FIG. 3.

FIGS. 2 and 3 also show clearly that in the region of its free end portion the handle 7 is guided in a longitudinal slot 10 provided in an upright wall portion 11 of the traverse member 4, and the handle 7 can thus move between two terminal positions one of which corresponds to a position in which the free end portion of the arm 5b of the lever 5 blocks the pin 2 if the latter is located proximal to the reinforcing plate 3 at the associated end of the slot 3 (see FIG. 2) and the other of which corresponds to the position in which the free end portion of the arm 5a of the lever 5 blocks the pin 2 if the same is located at that end of the slot 3 which is provided with the reinforcing plate 3a. There is further provided blocking means for blocking the handle 7 from movement away from its respectively selected terminal position. In the illustrated embodiment this blocking means is in form of a blocking member 12 which can be turnably lifted by turning it about a substantially horizontal axis 13 (compare FIG. 3) for which purpose a handle 14 is provided. When the handle 14 is in substantially horizontal position, as illustrated in FIGS. 2 and 3, the blocking member 12 extends across the slot 10 and is retained there by its own weight and that of the handle 14, thereby blocking the handle 7 in its respective terminal position. When it is desired to shift the handle 7 from one terminal position to the other, the handle 14 is raised whereby the member 12 is tilted upwardly about the pivot axis 13, becoming temporarily withdrawn from the slot 10 and permitting movement of the handle 7 along the slot 10 to the opposite terminal position. Release of the handle 14 then permits the latter and thereby the member 12 to descend under the influence of gravity to a position in which the member 12 again blocks the slot 10.

It will be understood that each of the elements described above, or two or more together, may also find a useful application in other types of constructions differing from the types described above.

While the invention has been illustrated and described as embodied in an agricultural machine, it is not intended to be limited to the details shown, since various modifications and structural changes may be made without departing in any way from the spirit of the present invention.

What is claimed as new and desired to be protected by Letters Patent is set forth in the appended.

We claim:

1. In an agricultural machine having a wheeled carriage which travels in a predetermined direction, a hitching pole for hitching said carriage to a locomotion-providing vehicle, mounting means mounting one end of said hitching pole on said carriage for pivoting movement of the hitching pole about a pivot axis between two positions relative to the carriage in one of which the hitching pole extends in substantial parallelism with the direction of travel of said carriage and in the other of which it extends transverse to said direction and laterally beyond said carriage, and arresting means operative for arresting said hitching pole in the respective positions thereof, the improvement wherein said arresting means comprises a pin rigidly provided on said hitching pole proximal to but spaced from said pivot axis, elongated guide means slidably guiding said pin for movement in a predetermined path between two end positions each of which corresponds to one of said positions of said hitching pole, locking means pivotably mounted for pivotal movement across said path and having two blocking portions which respectively block said path when said pin is in a respective one of said end positions, and operating means associated with said arresting means for effecting pivotal movement of said locking means in a sense blocking and unblocking said path at the will of an operator.

2. In an agricultural machine as defined in claim 1, wherein said guide means includes a traverse member provided on said carriage and having a guide slot located in a substantially horizontal plane and including two mutually inclined slot portions one of which extends substantially normal to the direction of movement of said carriage, and the other of which is inclined to said one portion and to said direction of movement.

3. In an agricultural machine as defined in claim 2, said locking means comprising a double-armed lever mounted on said traverse member laterally of said slot for said pivotal movement so that end sections of its respective arms which constitute said blocking portions may move across said slot in response to operation of said operating means, for thereby blocking said pin in a respective one of said end positions.

4. In an agricultural machine as defined in claim 3, said operating means comprising a rodlike handle associated with said lever and arranged to be gripped by the fingers of an operator.

5. In an agricultural machine as defined in claim 4; said arresting means further comprising pivot means mounting said lever on said traverse member and defining an axis for said pivotal moment of said lever, and further mounting said handle for turning movement about said axis.

6. In an agricultural machine as defined in claim 5; further comprising spring means connected with the opposite ends of said lever, and being further connected with said handle at a location thereof which is longitudinally spaced from said axis.

7. In an agricultural machine as defined in claim 4, said handle having a free end portion; and further comprising a guide arrangement associated with said free end portion of said handle for guiding the same for movement between a first and a second terminal position in each of which said handle moves one end section of one of said arms of said lever across said slot; and further comprising blocking means blocking said handle in the respective terminal positions thereof.